United States Patent
McCullough et al.

(10) Patent No.: US 10,822,078 B2
(45) Date of Patent: Nov. 3, 2020

(54) LOGISTICS SUPPORT AIRCRAFT HAVING A MINIMAL DRAG CONFIGURATION

(71) Applicant: Bell Textron Inc., Fort Worth, TX (US)

(72) Inventors: John Richard McCullough, Weatherford, TX (US); Paul K. Oldroyd, Azle, TX (US); Glenn Edward Isbell, Jr., Aledo, TX (US); Matthew John Hill, Keller, TX (US)

(73) Assignee: Bell Textron Inc., Fort Worth, TX (US)

( * ) Notice: Subject to any disclaimer, the term of this patent is extended or adjusted under 35 U.S.C. 154(b) by 61 days.

(21) Appl. No.: 16/427,311

(22) Filed: May 30, 2019

(65) Prior Publication Data
US 2020/0062384 A1    Feb. 27, 2020

Related U.S. Application Data

(63) Continuation-in-part of application No. 16/246,474, filed on Jan. 12, 2019, now Pat. No. 10,343,773, (Continued)

(51) Int. Cl.
*B64C 29/02* (2006.01)
*B64D 1/08* (2006.01)
(Continued)

(52) U.S. Cl.
CPC ............ *B64C 29/02* (2013.01); *B64C 39/024* (2013.01); *B64C 39/06* (2013.01); *B64D 1/08* (2013.01);
(Continued)

(58) Field of Classification Search
CPC ..... B64C 29/02; B64C 2201/128; B64D 1/08; B64D 25/12; G05D 1/0858
See application file for complete search history.

(56) References Cited

U.S. PATENT DOCUMENTS 1,655,113 A   1/1928  Nikola
3,002,712 A   10/1961 Sterling
(Continued)

FOREIGN PATENT DOCUMENTS

CN   105539833 A   5/2016
FR   2977865 A3    1/2013
(Continued)

OTHER PUBLICATIONS

Bell and NASA Partner for UAV Development; Transportup.com; Sep. 9, 2018.
(Continued)

*Primary Examiner* — Brian M O'Hara
(74) *Attorney, Agent, or Firm* — Lawrence Youst PLLC

(57) ABSTRACT

An aircraft is operable to transition between thrust-borne lift in a VTOL orientation and wing-borne lift in a biplane orientation. The aircraft includes an airframe having first and second wings with first and second pylons extending therebetween forming a central region. A two-dimensional distributed thrust array and a flight control system are coupled to the airframe. A nose cone and an afterbody are each selectively coupled to the airframe. In a cargo delivery flight configuration, the nose cone and the afterbody are coupled to the airframe such that the nose cone and the afterbody each extend between the first and second wings and between first and second pylons to form a cargo enclosure with an aerodynamic outer shape. In a minimal drag flight configuration, the nose cone and the afterbody are not coupled to the airframe such that air passes through the central region during flight.

20 Claims, 15 Drawing Sheets

Related U.S. Application Data which is a continuation of application No. 15/200,197, filed on Jul. 1, 2016, now Pat. No. 10,220,944.

(51) Int. Cl.
  *G05D 1/00* (2006.01)
  *B64C 39/02* (2006.01)
  *B64C 39/06* (2006.01)
  *B64D 25/12* (2006.01)

(52) U.S. Cl.
  CPC .......... *B64D 25/12* (2013.01); *G05D 1/0011* (2013.01); *B64C 2201/028* (2013.01); *B64C 2201/042* (2013.01); *B64C 2201/044* (2013.01); *B64C 2201/104* (2013.01); *B64C 2201/108* (2013.01); *B64C 2201/14* (2013.01); *B64C 2201/146* (2013.01)

(56) References Cited

U.S. PATENT DOCUMENTS

| | | |
|---|---|---|
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A * | 10/1967 | Schlieben ............ B64C 39/062 244/7 R |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,771,967 A | 9/1988 | Geldbaugh |
| 4,913,377 A | 4/1990 | Eickmann |
| 5,131,605 A | 7/1992 | Kress |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,367,528 B2 * | 5/2008 | Allison, Sr. ............ B64F 1/31 244/137.2 |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,505,846 B1 | 8/2013 | Sanders |
| 8,602,348 B2 | 12/2013 | Bryant |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0221780 A1 | 9/2007 | Builta |
| 2009/0008499 A1 | 1/2009 | Shaw |
| 2010/0147993 A1 | 6/2010 | Annati et al. |
| 2010/0295321 A1 | 11/2010 | Bevirt |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2014/0018979 A1 | 1/2014 | Goossen et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0158312 A1 | 6/2017 | Alber et al. |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002013 A1 | 1/2018 | McCullough et al. |
| 2018/0002026 A1 | 1/2018 | Oldroyd et al. |
| 2018/0244383 A1 | 8/2018 | Valente et al. |
| 2018/0265193 A1 | 9/2018 | Gibboney et al. |
| 2020/0023829 A1 * | 1/2020 | Hefner ............ B60V 3/08 |

FOREIGN PATENT DOCUMENTS

| | | | |
|---|---|---|---|
| WO | 2001074659 A1 | 10/2001 | |
| WO | 2005039973 A2 | 5/2005 | |
| WO | 2014067563 A1 | 5/2014 | |
| WO | WO-2015135951 A1 * | 9/2015 | ............ A63H 27/12 |
| WO | WO-2018200879 A1 * | 11/2018 | ............ B64C 29/02 |

(56) References Cited

FOREIGN PATENT DOCUMENTS

OTHER PUBLICATIONS

Bell APT—Automatic Pod Transport; suasnews.com; Dec. 6, 2017.
Bell Autonomous Pod Transport; monch.com; May 2, 2018.
Air Launched Unmanned Disaster Relief Delivery Vehicle, 33rd Annual AHS Student Design Competition, University of Maryland, Undated but admitted prior art.

* cited by examiner

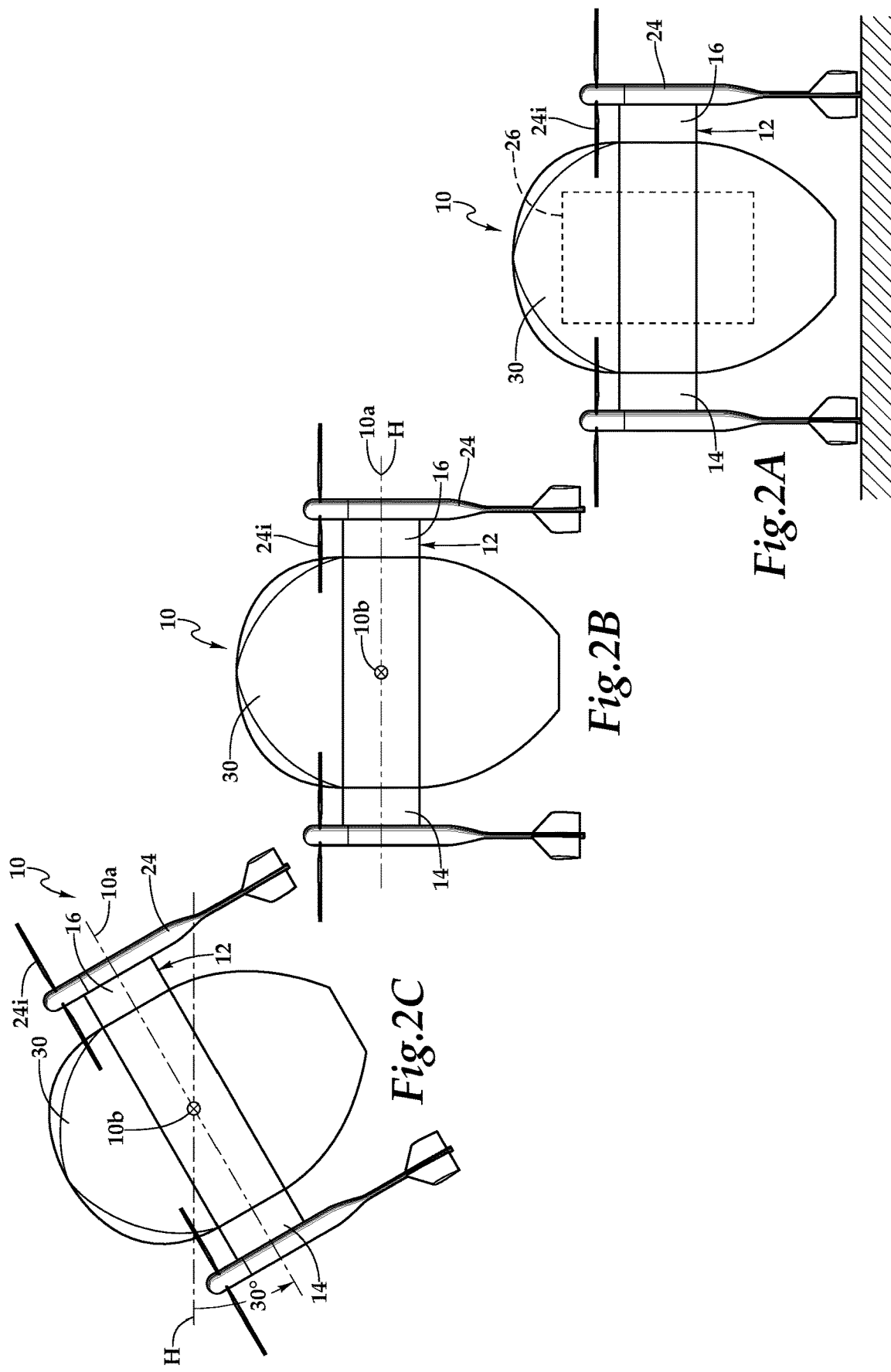

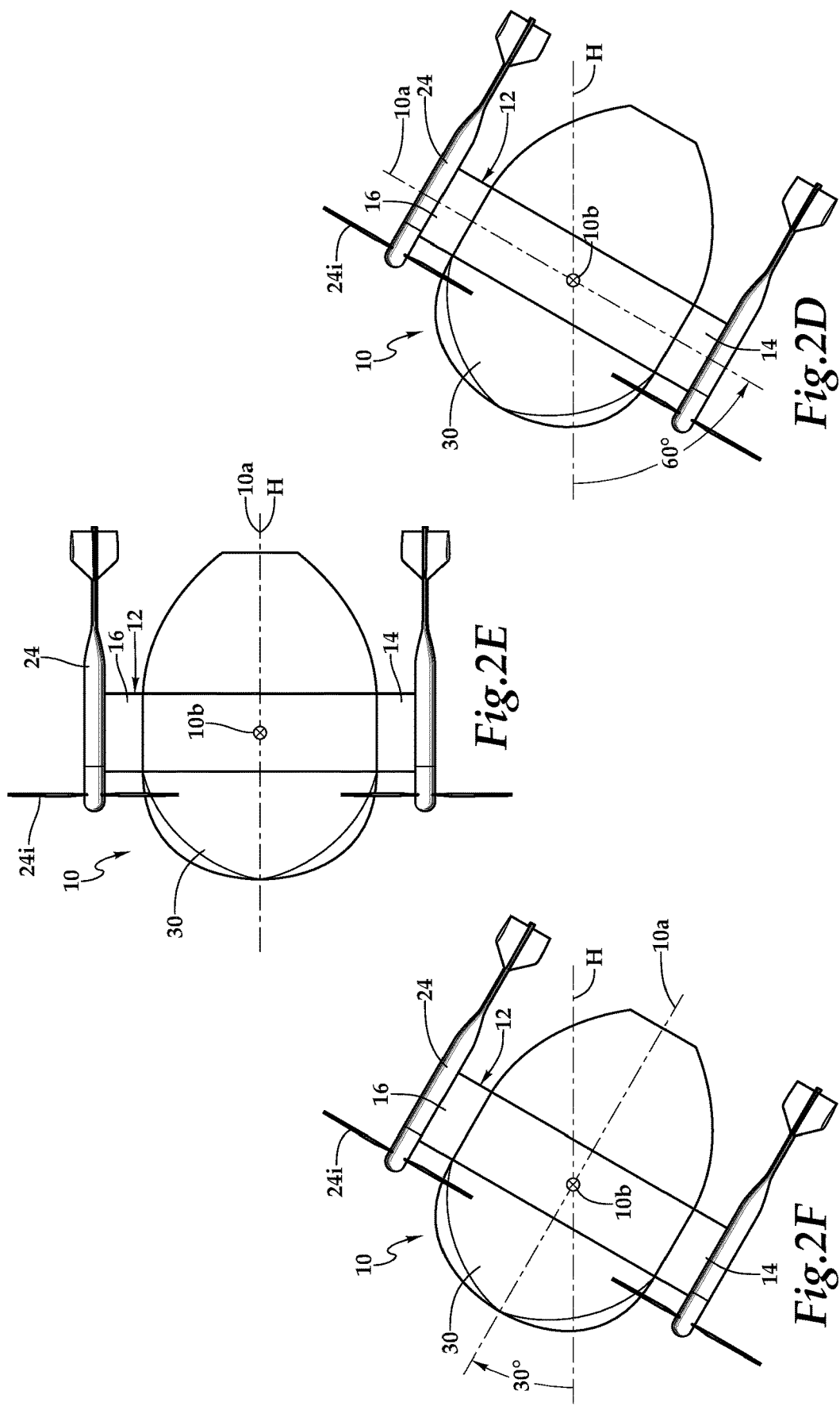

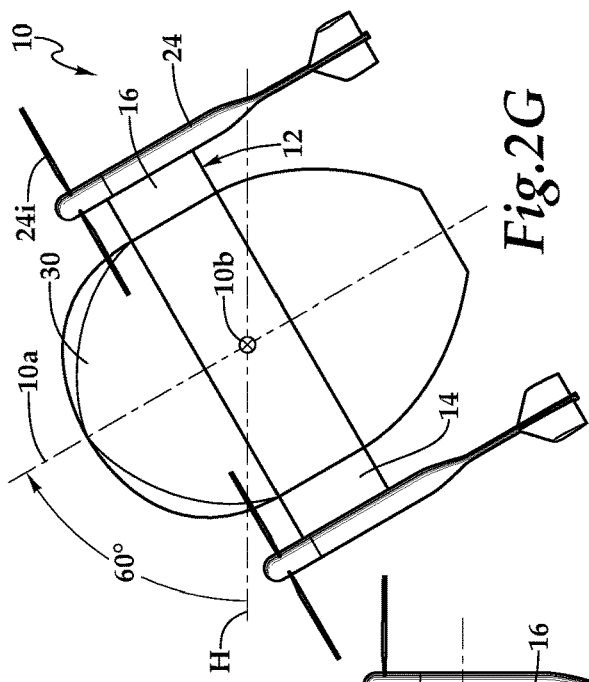
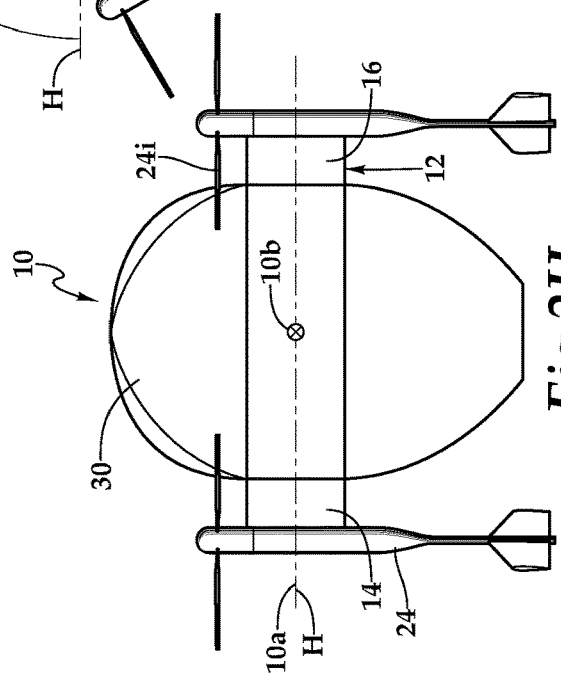
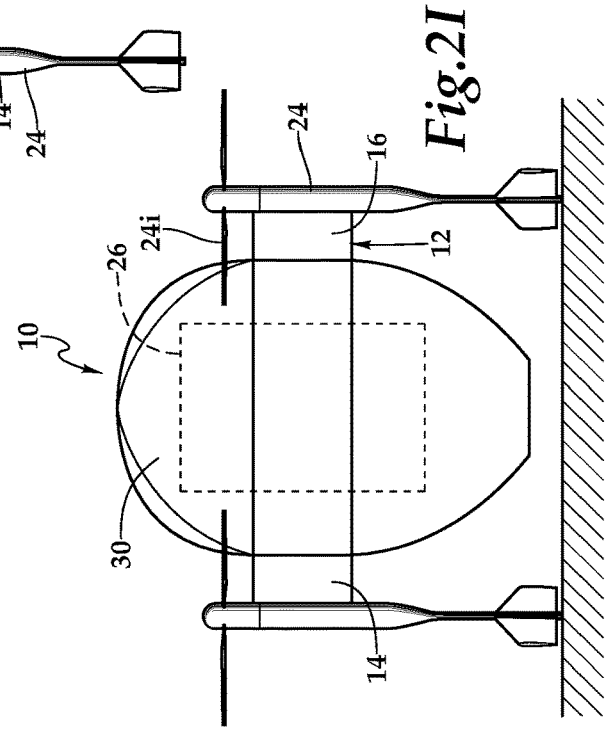
Fig.2G
Fig.2H
Fig.2I

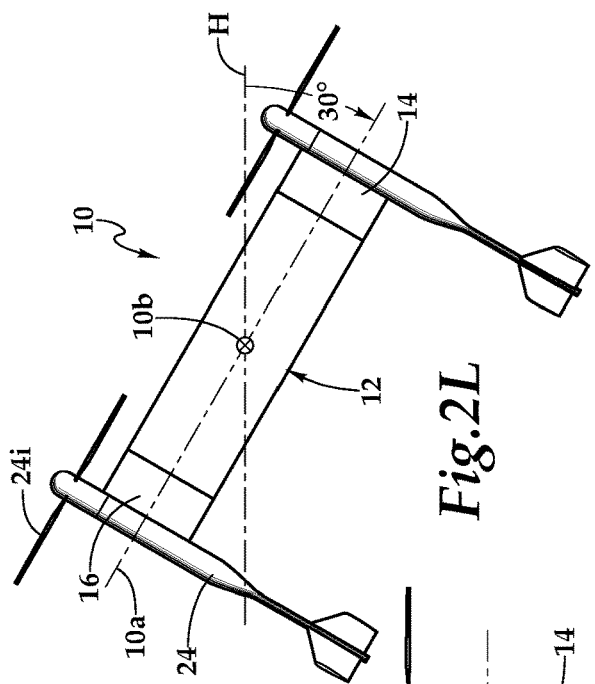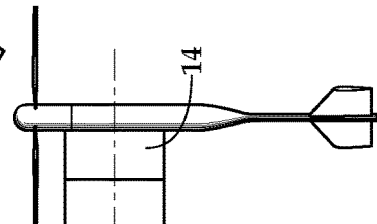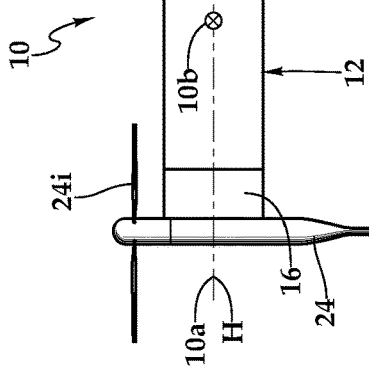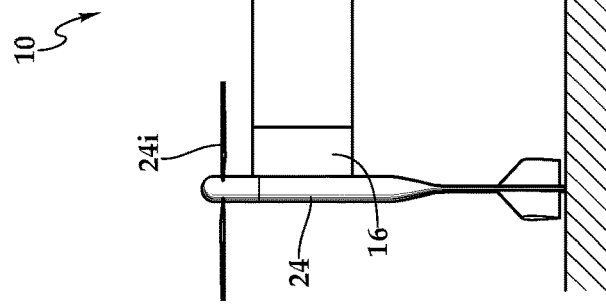

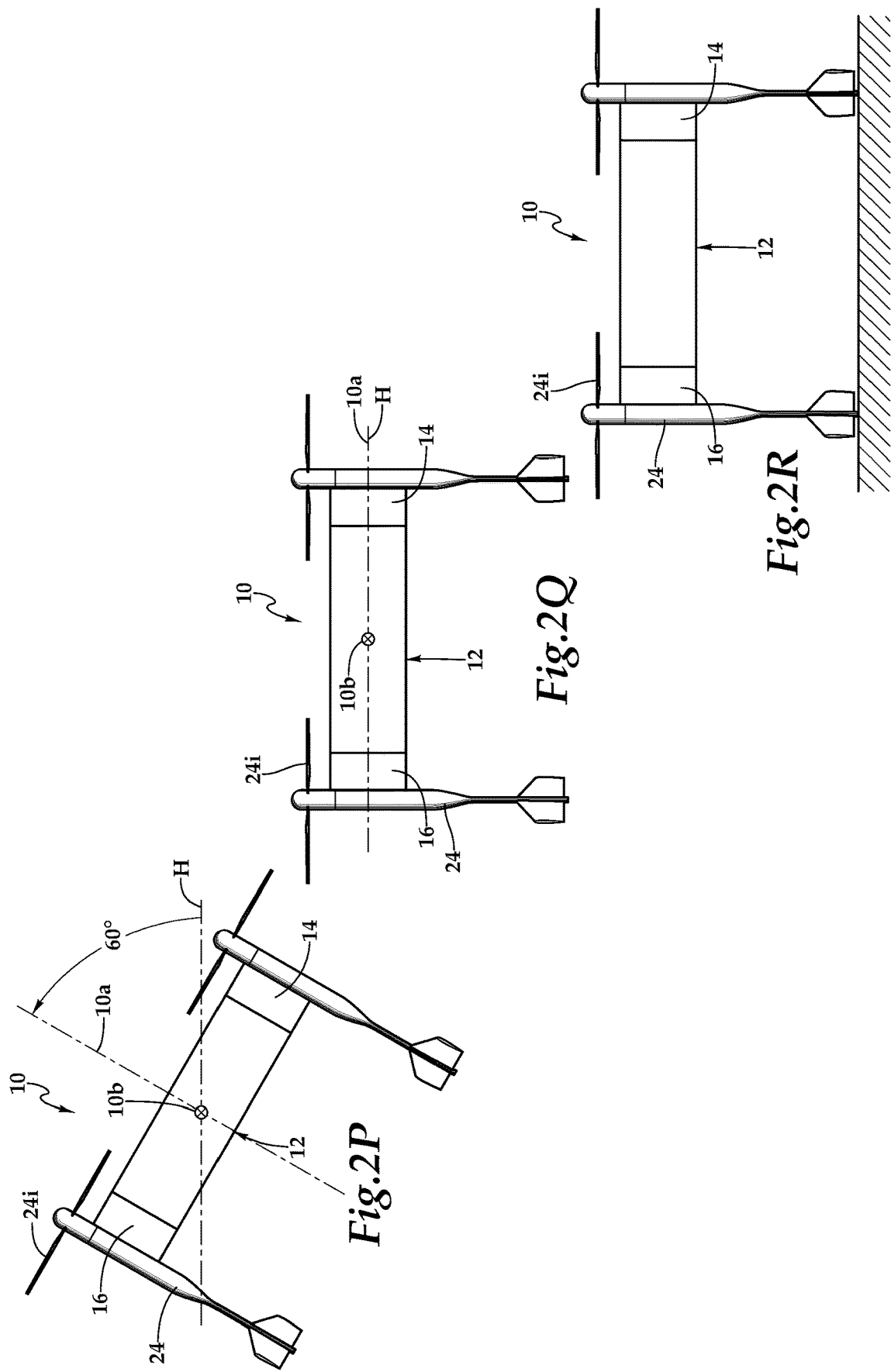

LOGISTICS SUPPORT AIRCRAFT HAVING A MINIMAL DRAG CONFIGURATION

CROSS-REFERENCE TO RELATED APPLICATIONS

The present application is a continuation-in-part of application Ser. No. 16/246,474 filed Jan. 12, 2019, which is a continuation of application Ser. No. 15/200,197 filed Jul. 1, 2016, now U.S. Pat. No. 10,220,944, the entire contents of each is hereby incorporated by reference.

TECHNICAL FIELD OF THE DISCLOSURE

The present disclosure relates, in general, to aircraft operable to transition between thrust-borne lift in a VTOL orientation and wing-borne lift in a biplane orientation and, in particular, to logistics support aircraft having a cargo delivery flight configuration and a minimal drag flight configuration.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing. A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to an aircraft operable to transition between thrust-borne lift in a VTOL orientation and wing-borne lift in a biplane orientation. The aircraft includes an airframe having first and second wings with first and second pylons extending therebetween forming a central region. A two-dimensional distributed thrust array is attached to the airframe. The thrust array includes a plurality of propulsion assemblies coupled to the first wing and a plurality of propulsion assemblies coupled to the second wing. A flight control system is coupled to the airframe and is operable to independently control each of the propulsion assemblies. A nose cone is selectively coupled to the airframe such that the nose cone extends between the first and second wings and between first and second pylons. An afterbody is selectively coupled to the airframe such that the afterbody extends between the first and second wings and between first and second pylons. In a cargo delivery flight configuration, the nose cone and the afterbody are coupled to the airframe to form a cargo enclosure with an aerodynamic outer shape. In a minimal drag flight configuration, the nose cone and the afterbody are not coupled to the airframe such that air passes through the central region during flight.

In certain embodiments, in the biplane orientation, the first wing may be an upper wing having a dihedral configuration and the second wing may be a lower wing having an anhedral configuration. In some embodiments, the central region may form a rectangle having a major dimension extending between the first and second wings and a minor dimension extending between first and second pylons, wherein the major dimension is greater than the minor dimension. In such embodiments, the major dimension may be between about two times and about four times greater than the minor dimension, the major dimension may be between about two times and about three times greater than the minor dimension or the major dimension may be about two and half times greater than the minor dimension. In certain embodiments, each of the propulsion assemblies may be outboard of the central region. In some embodiments, each of the propulsion assemblies may include a variable speed electric motor and a rotor assembly. In certain embodiments, each of the propulsion assemblies may be a thrust vectoring propulsion assembly such as a longitudinal thrust vectoring propulsion assembly or an omnidirectional thrust vectoring propulsion assembly.

In some embodiments, each of the propulsion assemblies may include a tail assembly with at least one aerosurface. In certain embodiments, two propulsion assemblies may be coupled to the first wing and two propulsion assemblies may be coupled to the second wing. In some embodiments, the nose cone may include a leading edge fairing that is slidably receivable on the airframe. In certain embodiments, the afterbody may include a trailing edge fairing that is slidably receivable on the airframe. In such embodiments, the trailing edge fairing may include first and second trailing edge members that are rotatable relative to the first and second pylons, respectively, such that the first and second trailing edge members have open and closed positions.

In a second aspect, the present disclosure is directed to a method of operating an aircraft. The method includes providing an airframe having first and second wings with first and second pylons extending therebetween forming a central region, a plurality of propulsion assemblies coupled to the first wing, a plurality of propulsion assemblies coupled to the second wing and a flight control system operable to independently control each of the propulsion assemblies; forming a cargo enclosure having an aerodynamic outer shape by attaching a nose cone to the airframe such that the nose cone extends between the first and second wings and between first and second pylons and by attaching an afterbody to the airframe such that the afterbody extends between the first and second wings and between first and second pylons; disposing cargo within the cargo enclosure; transporting the cargo by air from a first location to a second location including transitioning the aircraft between thrust-borne lift in a VTOL orientation and wing-borne lift in a biplane orientation; removing the cargo from the cargo enclosure at the second location; detaching the nose cone and the afterbody from the airframe forming a minimal drag flight configuration in which air passes through the central region during flight; and returning the aircraft by air from the second location to the first location in the minimal drag flight configuration including transitioning the aircraft between thrust-borne lift in the VTOL orientation and wing-borne lift in the biplane orientation.

The method may also include transitioning the aircraft between the VTOL orientation wherein the first wing is forward of the cargo enclosure and the second wing is aft of the cargo enclosure and the biplane orientation wherein the first wing is below the cargo enclosure and the second wing is above the cargo enclosure; operating the aircraft responsive to autonomous flight control; operating the aircraft responsive to remote flight control; operating the aircraft responsive to a combination of remote flight control and autonomous flight control and/or attaching the nose cone to the airframe by slidably receiving a leading edge fairing on the airframe; attaching the afterbody to the airframe by slidably receiving a trailing edge fairing on the airframe; detaching the nose cone from the airframe by slidably removing the leading edge fairing from the airframe; and detaching the afterbody from the airframe by slidably removing the trailing edge fairing from the airframe.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
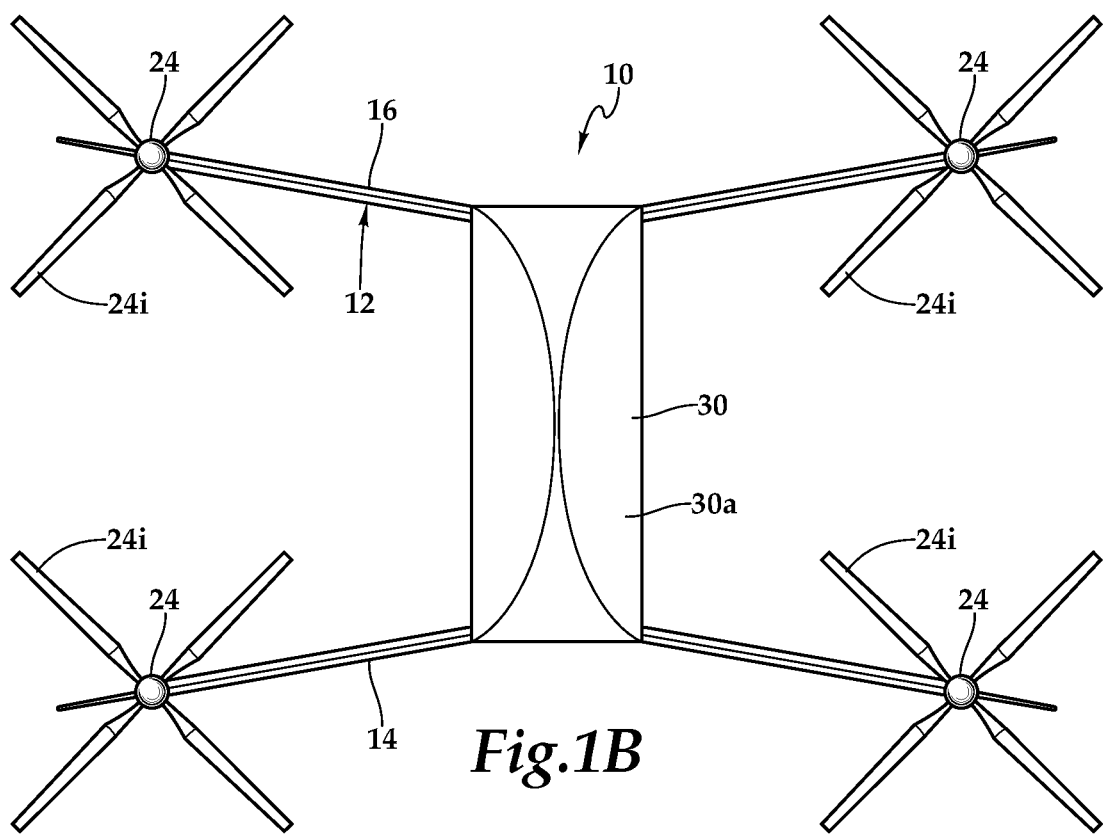
FIGS. 1A-1H are schematic illustrations of an aircraft operable to transition between thrust-borne lift in a VTOL orientation and wing-borne lift in a biplane orientation in accordance with embodiments of the present disclosure.
Figure 1A:
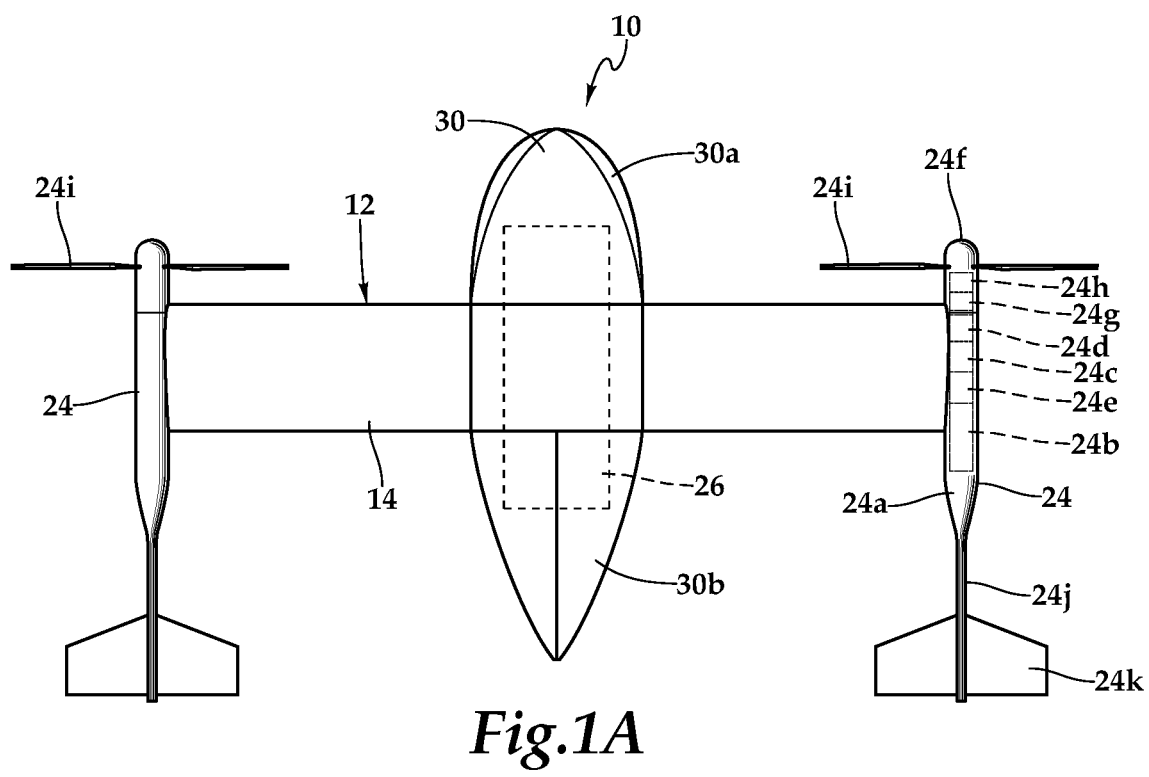
Figure 1D:
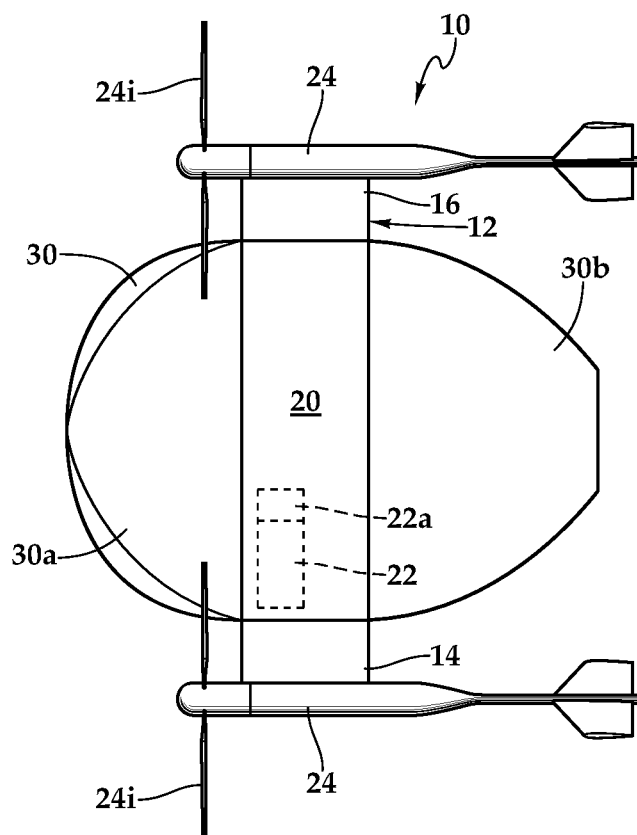
Figure 1C:
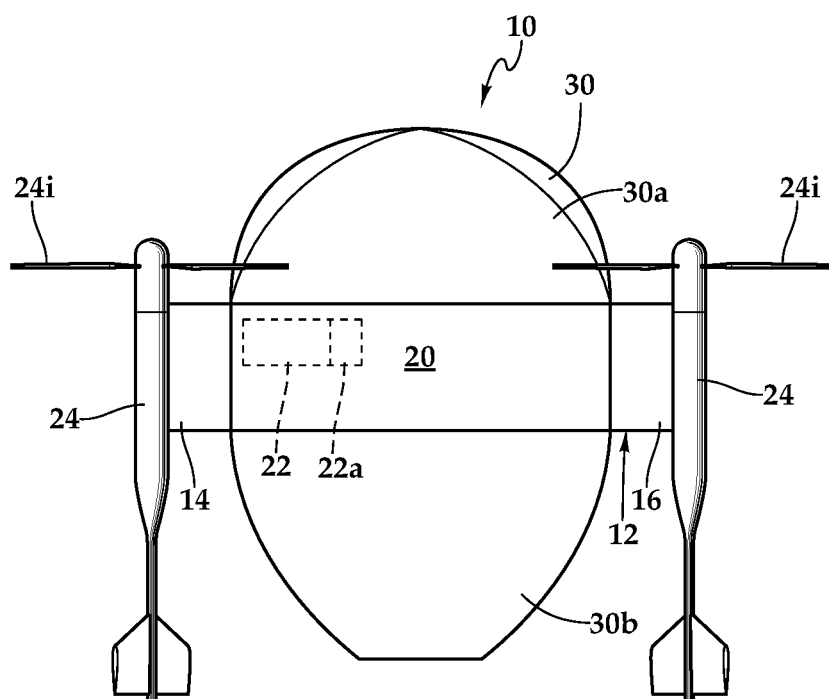
Figure 1F:
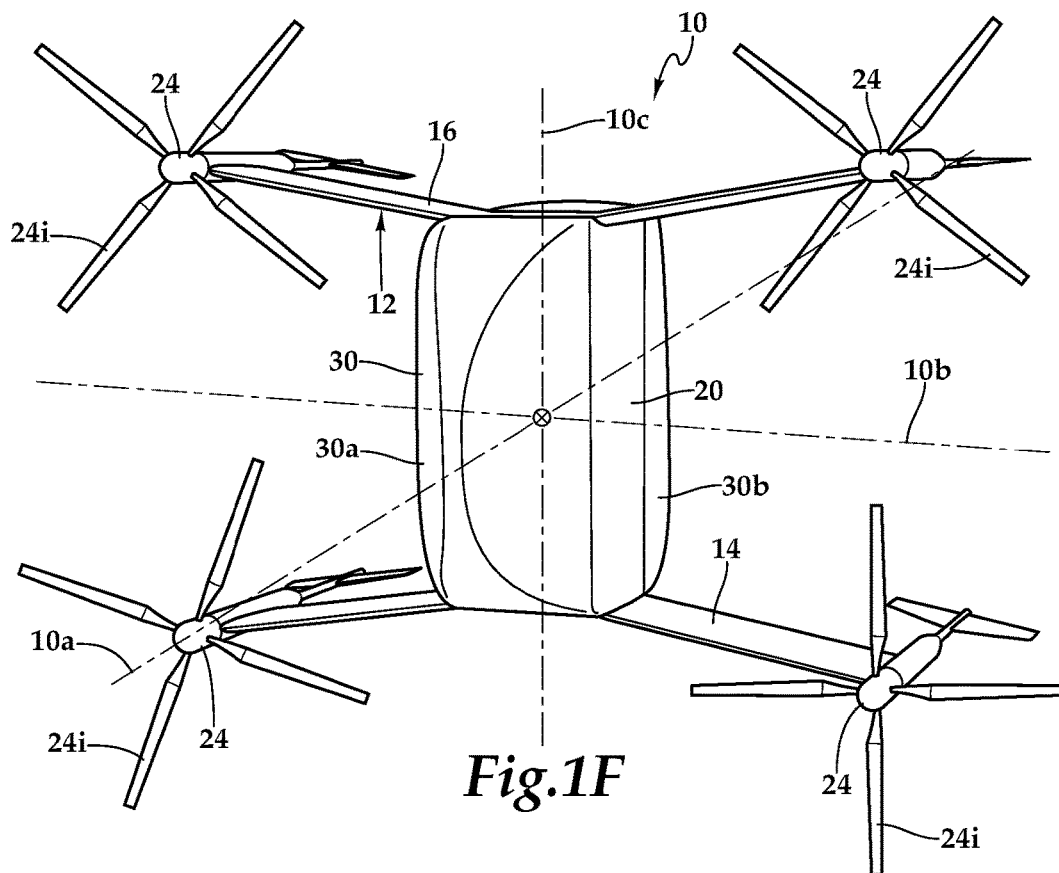
Figure 1E:
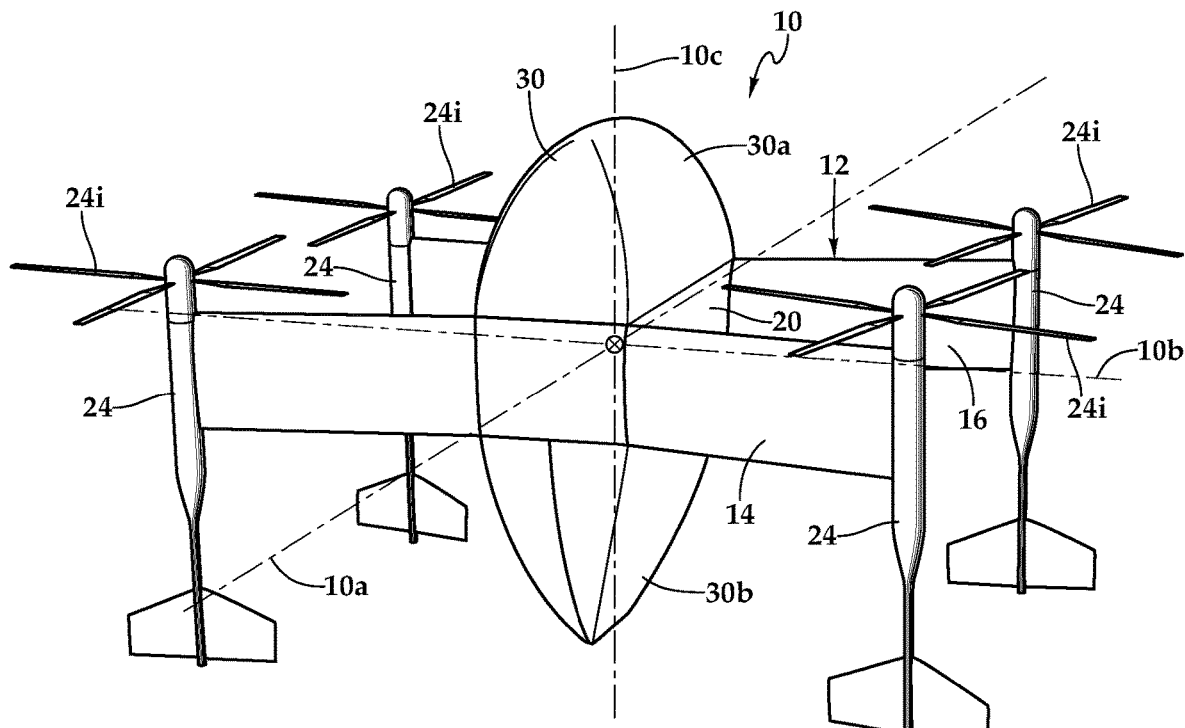

Referring to FIGS. 1A-1H in the drawings, various views of an aircraft 10 operable to transition between thrust-borne lift in a VTOL orientation and wing-borne lift in a biplane orientation are depicted. FIGS. 1A, 1C, 1E and 1G depict aircraft 10 in the VTOL orientation wherein the propulsion assemblies provide thrust-borne lift. FIGS. 1B, 1D, 1F and 1H depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. Aircraft 10 has a longitudinal axis 10$a$ that may also be referred to as the roll axis, a lateral axis 10$b$ that may also be referred to as the pitch axis and a vertical axis 10$c$ that may also be referred to as the yaw axis, as best seen in FIGS. 1E and 1F. When longitudinal axis 10$a$ and lateral axis 10$b$ are both in a horizontal plane and normal to the local vertical in the earth's reference frame, aircraft 10 has a level flight attitude.

Figure 1H:
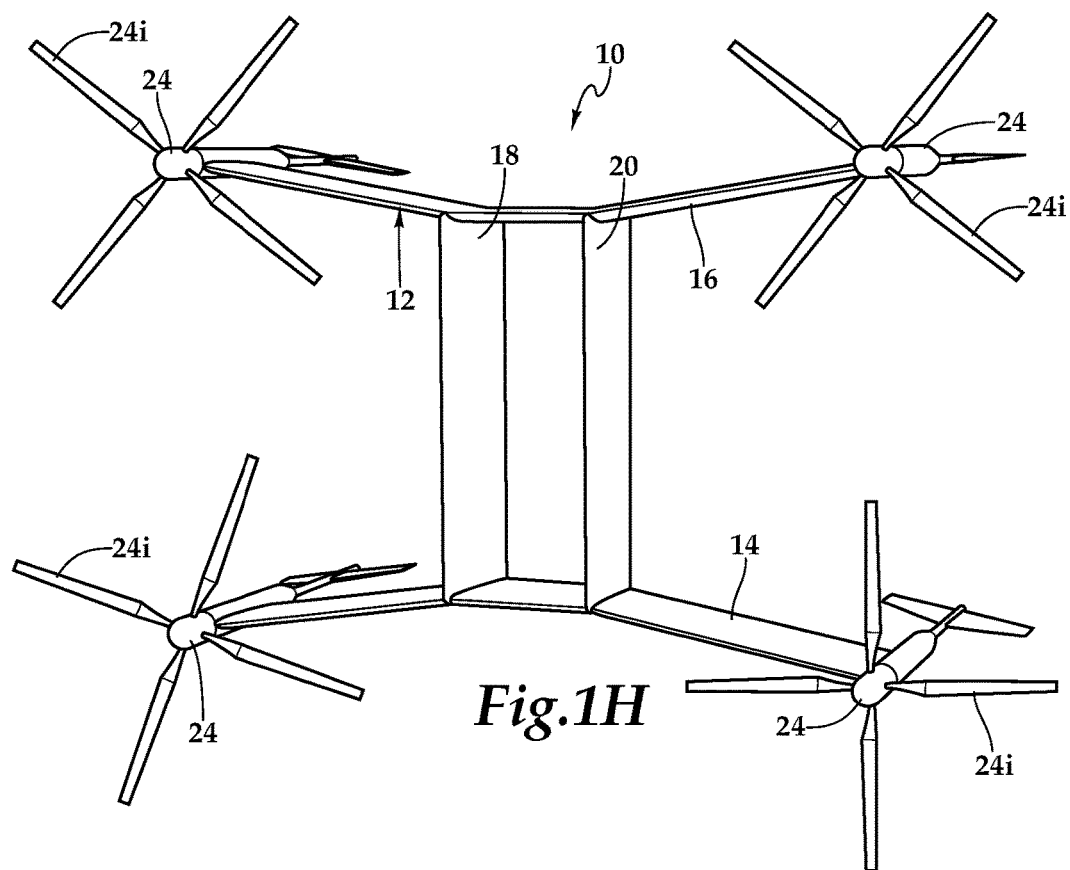
Figure 1G:
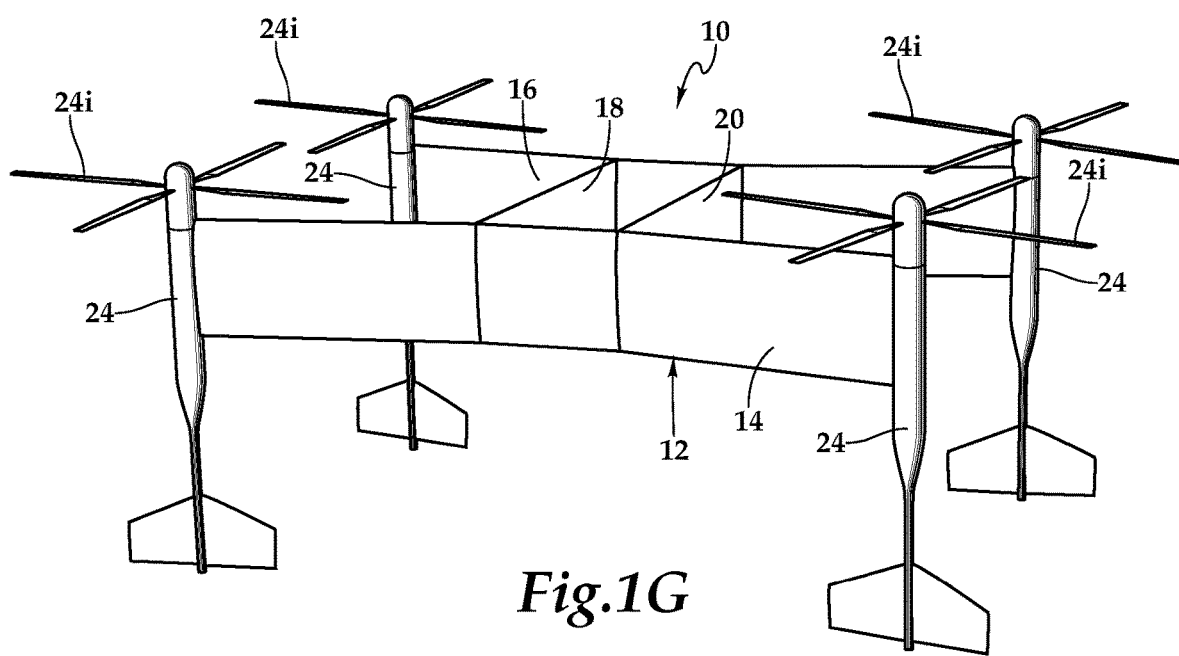

In the illustrated embodiment, aircraft 10 includes an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As best seen in FIG. 1B, in the biplane orientation of aircraft 10, wing 16 is an upper wing having a dihedral configuration and wing 14 is a lower wing having an anhedral configuration. In other embodiments, wings 14, 16 could have other designs such as straight wing designs, swept wing designs or other suitable wing design. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. As best seen in FIGS. 1G-1H, wings 14, 16 and pylons 18, 20 create a central region in the form a rectangle having a major dimension extending between wings 14, 16 and a minor dimension extending between pylons 18, 20, wherein the major dimension is greater than the minor dimension. For example, the major dimension may be between about two times and about four times greater than the minor dimension. As another example, the major dimension may be between about two times and about three times greater than the minor dimension. In the illustrated embodiment, the major dimension is about two and half times greater than the minor dimension.

Wings 14, 16 and pylons 18, 20 preferably include internal passageways operable to contain flight control systems, energy sources, communication lines and other desired systems. For example, as best seen in FIGS. 1C and 1D, pylon 20 houses the flight control system 22 of aircraft 10. Flight control system 22 is preferably a redundant digital flight control system including multiple independent flight control computers. For example, the use of a triply redundant flight control system 22 improves the overall safety and reliability of aircraft 10 in the event of a failure in flight control system 22. Flight control system 22 preferably includes non-transitory computer readable storage media including a set of computer instructions executable by one or more processors for controlling the operation of aircraft 10. Flight control system 22 may be implemented on one or more general-purpose computers, special purpose computers or other machines with memory and processing capability. For example, flight control system 22 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 22 may be a microprocessor-based system operable to execute program code in the form of machine-executable instructions. In addition, flight control system 22 may be selectively connectable to other computer systems via a proprietary encrypted network, a public encrypted network, the Internet or other suitable communication network that may include both wired and wireless connections.

Wings 14, 16 and pylons 18, 20 may contain one or more of electrical power sources depicted as one or more batteries 22a in pylon 20, as best seen in FIGS. 1C and 1D. Batteries 22a supply electrical power to flight control system 22. In some embodiments, batteries 22a may be used to supply electrical power for the distributed thrust array of aircraft 10. Wings 14, 16 and pylons 18, 20 also contain a communication network that enables flight control system 22 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually and collectively denoted as 24. In the illustrated embodiment, two propulsion assemblies 24 are coupled to wing 14 and two propulsion assemblies 24 are coupled to wing 16 such that each propulsion assembly 24 is outboard of the central region of airframe 12. In other embodiments, aircraft 10 could have other numbers of propulsion assemblies both greater than or less than four in other configurations. In the illustrated embodiment, propulsion assemblies 24 are variable speed propulsion assemblies having fixed pitch rotor blades and thrust vectoring capability. Depending upon the implementation, propulsion assemblies 24 may have longitudinal thrust vectoring capability, lateral thrust vectoring capability or omnidirectional thrust vectoring capability. In other embodiments, propulsion assemblies 24 may be single speed propulsion assemblies, may have variable pitch rotor blades and/or may be non thrust vectoring propulsion assemblies.

In the illustrated embodiment, propulsion assemblies 24 are coupled to the outboard ends of wings 14, 16 in a midwing configuration. In other embodiments, propulsion assemblies 24 could be coupled to wings 14, 16 at midspan, in a high wing configuration and/or in a low wing configuation or various combination or permutations thereof. Propulsion assemblies 24 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 24 can be decoupled from airframe 12 by simple operations and another propulsion assembly 24 can then be attached to airframe 12. In other embodiments, propulsion assemblies 24 may be permanently coupled to wings 14, 16 by riveting, bonding, welding, bolting and/or other suitable technique.

As best seen in FIG. 1A, each propulsion assembly 24 includes a nacelle 24a that houses components including a battery 24b, an electronic speed controller 24c, a gimbal actuator 24d, an electronics node 24e, sensors and other desired electronic equipment. Nacelle 24a also supports a propulsion system 24f including a gimbal 24g, a variable speed electric motor 24h and a rotor assembly 24i. Extending from a lower end of nacelle 24a is a tail assembly 24j that includes aerosurfaces 24k. As the power for each propulsion assembly 24 is provided by batteries 24b housed within the respective nacelle 24a, aircraft 10 has a distributed power system for the distributed thrust array. Alternatively or additionally, electrical power may be supplied to the electric motors 24h and/or the batteries 24b disposed with the nacelles 24a from batteries 22a carried by airframe 12 via the communications network. In other embodiments, power for the propulsion assemblies of aircraft 10 may be provided by one or more internal combustion engines, electric generators and/or hydraulic motors. In the illustrated embodiment, aerosurfaces 24k of propulsion assemblies 24 are stationary and are parallel to the respective wing to which the nacelle is attached to primarily serve as horizontal stabilizers. In other embodiments, aerosurfaces 24k may additionally or alternatively include vertical stabilizers. In still other embodiments, aerosurfaces 24k may be active aerosurfaces that serve as elevators to control the pitch or angle of attack of wings 14, 16 and/or ailerons to control the roll or bank of aircraft 10 in the biplane orientation of aircraft 10. Aerosurfaces 24 also serve to enhance hover stability in the VTOL orientation of aircraft 10.

Flight control system 22 communicates via the wired communications network of airframe 12 with the electronics nodes 24e of the propulsion assemblies 24. Flight control system 22 receives sensor data from and sends flight command information to the electronics nodes 24e such that each propulsion assembly 24 may be individually and independently controlled and operated. For example, flight control system 22 is operable to individually and independently control the speed and the thrust vector of each propulsion assembly 24. Flight control system 22 may autonomously control some or all aspects of flight operation for aircraft 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for aircraft 10. The autonomous and/or remote operation of aircraft 10 enables aircraft 10 to perform unmanned logistics operations for both military and commercial applications.

Each propulsion assembly 24 includes a rotor assembly 24i that is coupled to an output drive of a respective electrical motor 24h that rotates the rotor assembly 24i in a rotational plane to generate thrust for aircraft 10. In the illustrated embodiment, rotor assemblies 24i each include four rotor blades having a fixed pitch. In other embodiments, the rotor assemblies could have other numbers of rotor blades including rotor assemblies having less than or more than four rotor blades. Alternatively or additionally, the rotor assemblies could have variable pitch rotor blades with collective and/or cyclic pitch control. Each electrical motor 24h is paired with a rotor assembly 24i to form a propulsion system 24f. In the illustrated embodiment, each propulsion system 24f has a two-axis tilting degree of freedom relative to nacelle 24a provided by gimbal 24g such that propulsion assemblies 24 are omnidirectional thrust vectoring propulsion assemblies. In the illustrated embodiment, the maximum angle of the thrust vector may preferably be between about 10 degrees and about 30 degrees, may more preferably be between about 15 degrees and about 25 degrees and may most preferably be about 20 degrees. Notably, using a 20-degree thrust vector yields a lateral component of thrust that is about 34 percent of total thrust. In other embodiments, the propulsion systems may have a single-axis tilting degree of freedom in which case, the propulsion assemblies could act as longitudinal and/or lateral thrust vectoring propulsion assemblies.

Figure 5A:
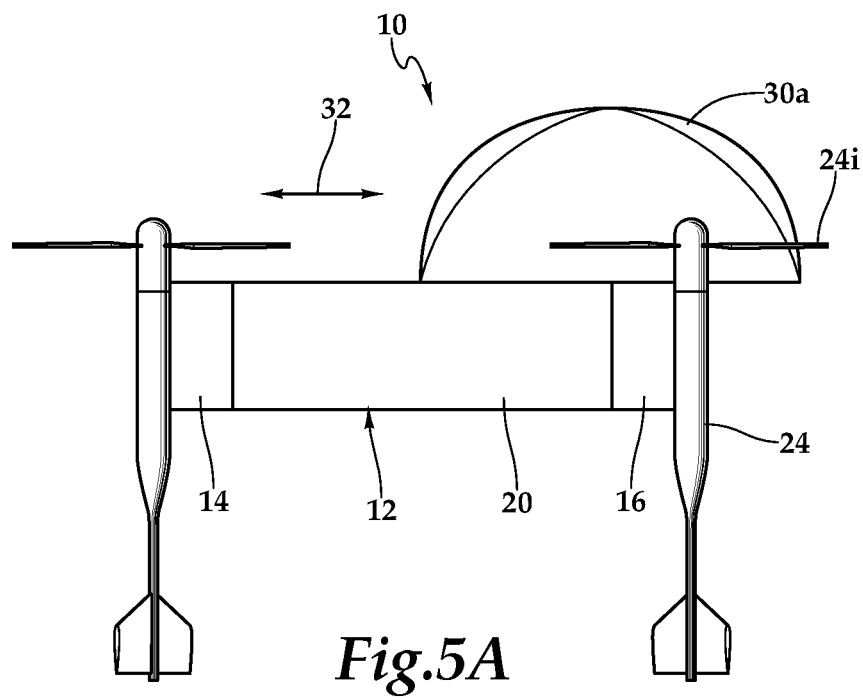
FIGS. 5A-5B are schematic illustrations of a coupling implementation of a cargo enclosure for an aircraft in accordance with embodiments of the present disclosure.
Figure 5B:
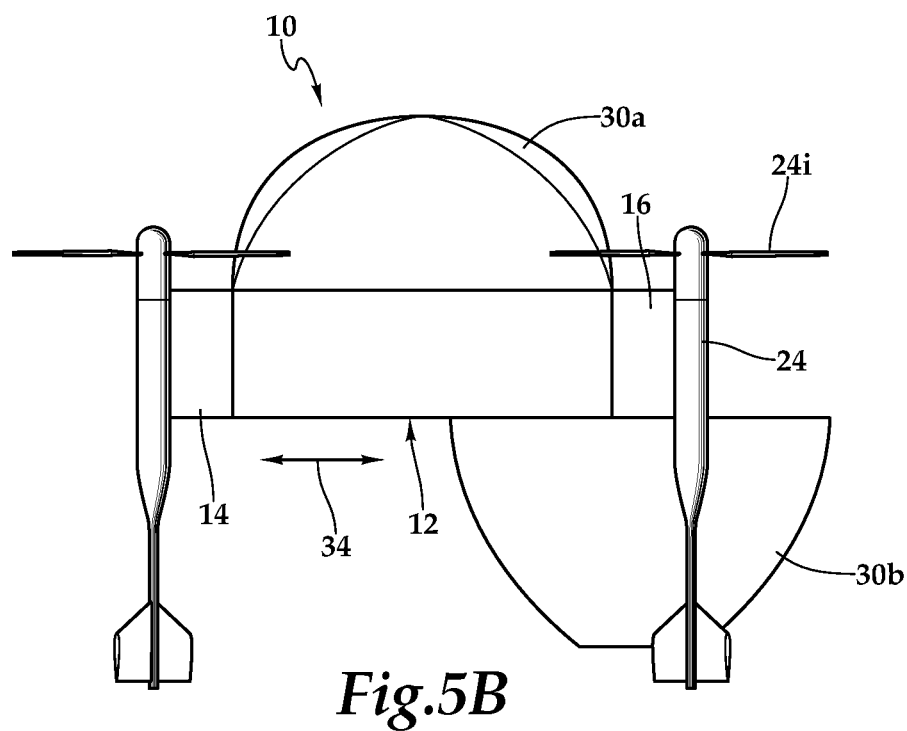

In one non-limiting example, aircraft 10 may operate as a logistics support aircraft. As best seen in FIG. 1A, cargo depicted as a package 26 has been secured within a cargo enclosure 30 of aircraft 10. Cargo enclosure 30 has an aerodynamic outer shape and is selectively attachable to and detachable from airframe 12. In the illustrated embodiment, cargo enclosure 30 is formed from a nose cone depicted as a leading edge fairing 30a and an afterbody depicted as a trailing edge fairing 30b. Nose cone 30a may be securably coupled to the top of airframe 12 when aircraft 10 is resting in the tailsitter position, such that nose cone 30a extends between wings 14, 16 and between pylons 18, 20. Similarly, afterbody 30b may be securably coupled to the bottom of airframe 12 when aircraft 10 is resting in the tailsitter position, such that afterbody 30b extends between wings 14, 16 and between pylons 18, 20. For example, as best seen in FIG. 5A, nose cone 30a may be slidably received by airframe 12 on a rail system or other suitable connection, as indicates by the arrow 32. Once nose cone 30a is fully positioned on airframe 12, nose cone 30a may be locked thereto to prevent relative movement. Likewise, as best seen in FIG. 5B, afterbody 30b may be slidably received by airframe 12 on a rail system or other suitable connection, as indicates by the arrow 34. Once afterbody 30b is fully positioned on airframe 12, afterbody 30b may be locked thereto to prevent relative movement. In other embodiments, nose cone 30a and/or afterbody 30b may be securably coupled to airframe 12 by bolting, snapping, clipping, pinning or other suitable technique.

In the illustrated implementation, cargo 26 is depicted as a single package carried within cargo enclosure 30. In other implementation, cargo 26 may be composed of any number of packages or other items that can be carried within cargo enclosure 30. Preferably, cargo 26 is fixably coupled within cargo enclosure 30 by suitable means to prevent relative movement therebetween, thus protecting cargo 26 from damage and maintaining a stable center of mass for aircraft 10. In addition, cargo 26 may be insertable into and removable from cargo enclosure 30 to enable sequential cargo pickup, transportation and delivery operations to and from multiple locations. Alternatively or additionally, cargo 26, nose cone 30a and afterbody 30b may be removed from airframe 12, as best seen in FIGS. 5A-5B, upon delivery of cargo 26 resulting in a minimal drag flight configuration of aircraft 10, as best seen in FIGS. 1G-1H.

Figure 6A:
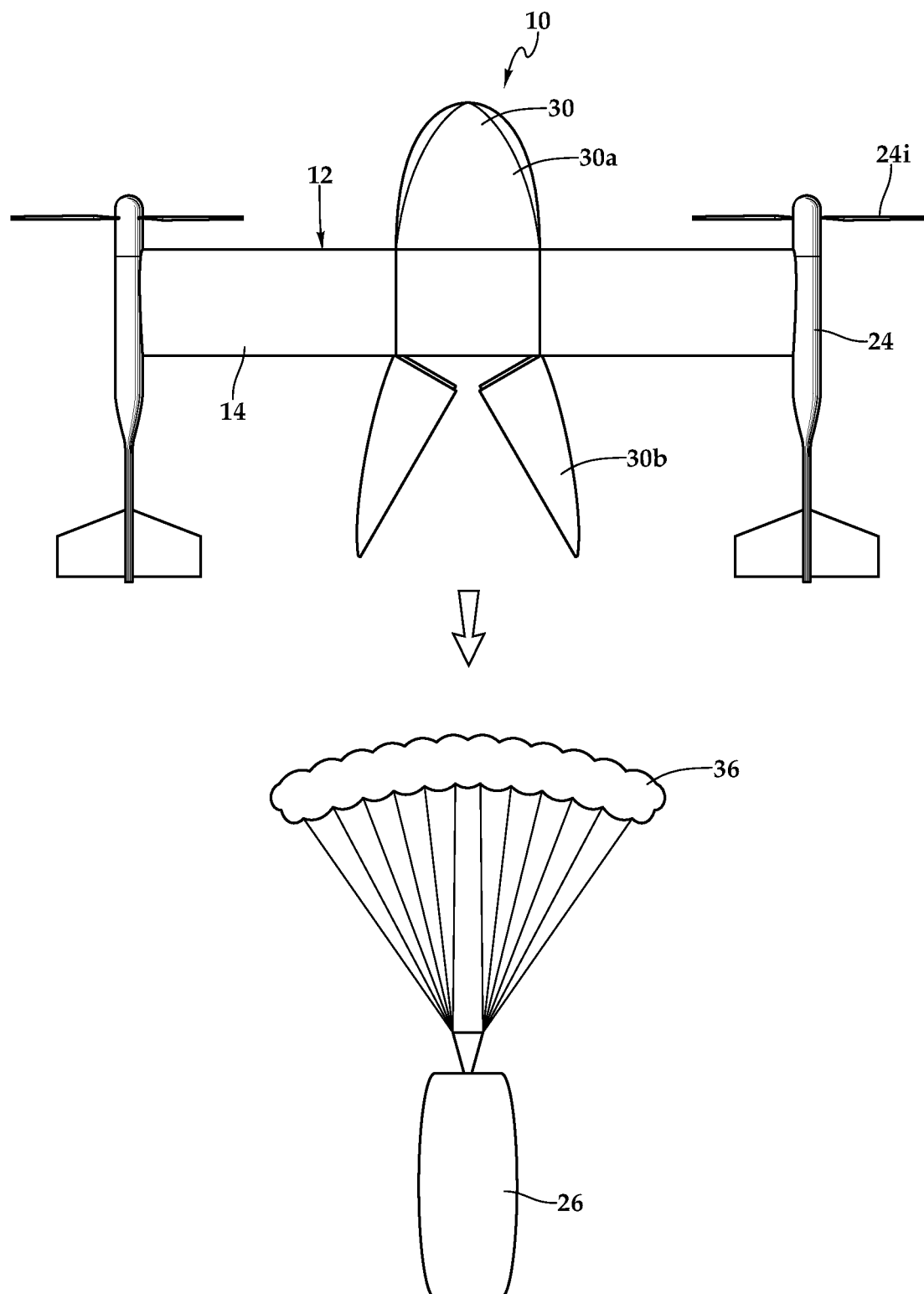
FIGS. 6A-6B are schematic illustrations of cargo delivery implementations enabled by an aircraft in accordance with embodiments of the present disclosure.
Figure 6B:
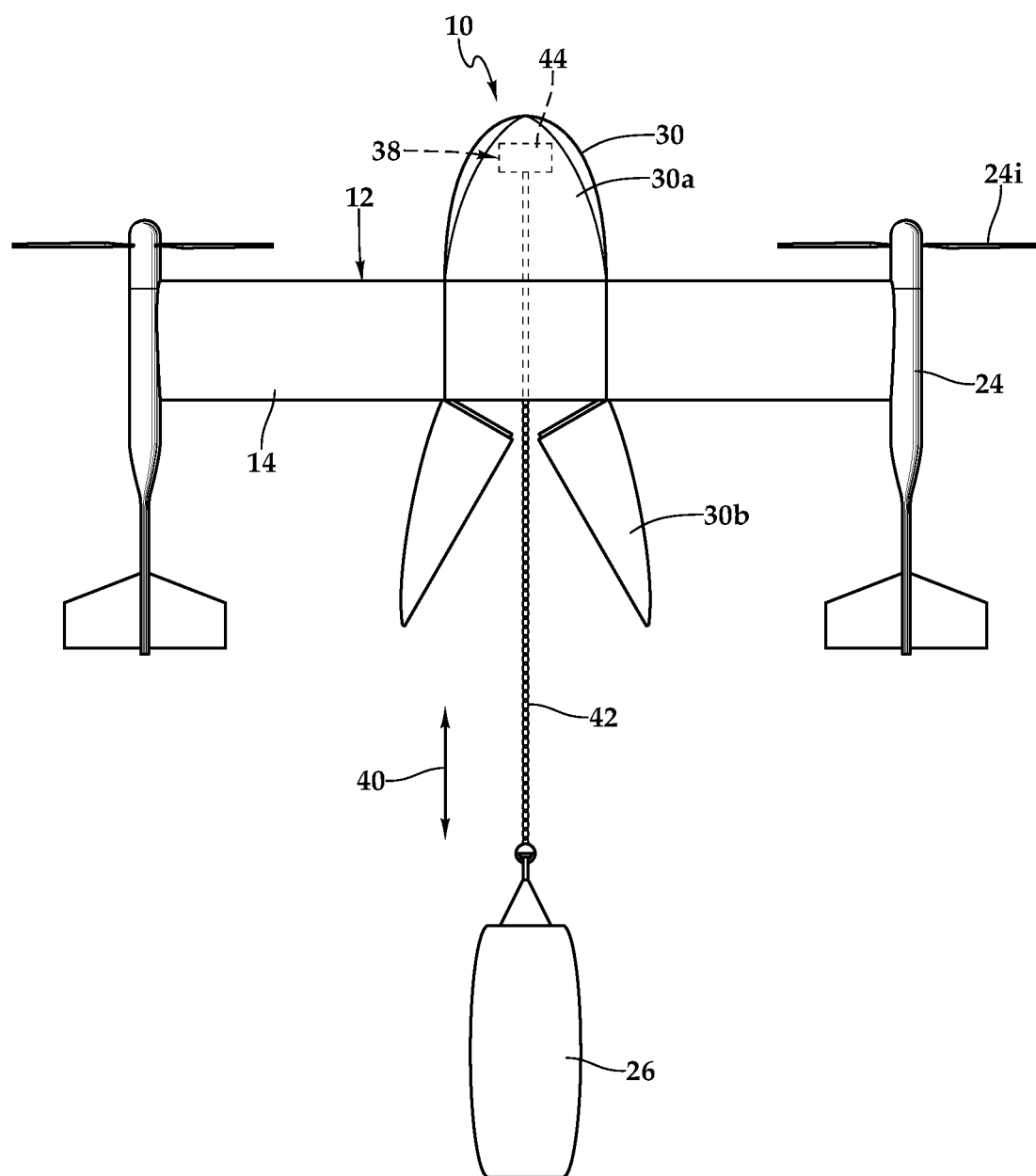

Aircraft 10 and cargo enclosure 30 preferably have remote release capabilities of cargo 26. For example, this feature allows airframe 12 to deliver cargo 26 to a desired location following transportation without the requirement for landing. In this case, afterbody 30b preferably includes a pair of trailing edge members depicted as rotatable doors that operate in a clamshell manner relative to pylons 18, 20 responsive to instructions received from flight control system 22. For example, as best seen in FIG. 6A, during a package delivery mission and upon reaching the desired location, flight control system 22 has caused the doors of afterbody 30b to open such that cargo 26 can be released from aircraft 10 via airdrop. In the illustrated embodiment, cargo 26 has a parachute 36 attached thereto to aid in controlling the speed at which cargo 26 descends to the ground. In other implementations, cargo 26 may be airdropped from aircraft 10 without the aid of a parachute. Alternatively, the delivery or pickup of cargo 26 may be accomplished using a cargo hook module including a cargo hoisting device 38 disposed within nose cone 30a that is operable to raise and/or lower cargo 26 while aircraft 10 remains in a stable hover, as indicated by arrow 40 in FIG. 6B. Cargo hoisting device 38 may include a retractable hoisting cable 42 that is supported by a cargo hook winch system 44. It should be noted that these remote release capabilities allow aircraft 10 to jettison cargo 26 during flight, for example, in the event of an emergency situation such as a propulsion assembly or other system of aircraft 10 becoming compromised.

Referring additionally to FIGS. 2A-2R in the drawings, a sequential flight-operating scenario of aircraft 10 is depicted. As best seen in FIG. 2A, aircraft 10 is in a tailsitter position on the ground with cargo enclosure 30 attached to airframe 12 and with cargo 26 secured within cargo enclosure 30. When aircraft 10 is ready for a logistics support mission, flight control system 22 commences operations providing flight commands to the various components of aircraft 10. Flight control system 22 may be operating responsive to autonomous flight control, remote flight control or a combination thereof. For example, it may be desirable to utilize remote flight control during certain maneuvers such as takeoff and landing but rely on autonomous flight control during hover, high speed forward flight and/or transitions between wing-borne flight and thrust-borne flight.

As best seen in FIG. 2B, aircraft 10 has performed a vertical takeoff and is engaged in thrust-borne lift in the VTOL orientation of aircraft 10. As illustrated, rotor assemblies 24i of propulsion assemblies 24 are each rotating in the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL orientation, wing 14 is forward of cargo enclosure 30 and wing 16 is aft of cargo enclosure 30. As discussed herein, flight control system 22 independently controls and operates each propulsion assembly 24 including independently controlling speed and thrust vector. During hover, flight control system 22 may utilize differential speed control and/or differential or collective thrust vectoring of propulsion assemblies 24 to provide hover stability for aircraft 10 and to provide pitch, roll, yaw and translation authority for aircraft 10.

After vertical ascent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10a extends out of the horizontal plane H such that aircraft 10 has an inclined flight attitude of about thirty degrees pitch down. As seen in FIG. 2D, longitudinal axis 10a extends out of the horizontal plane H such that aircraft 10 has an inclined flight attitude of about sixty degrees pitch down. Flight control system 22 may achieve this operation through speed control of some or all of propulsion assemblies 24, thrust vectoring of some or all of propulsion assemblies 24 or any combination thereof.

As best seen in FIG. 2E, rotor assemblies 24i of propulsion assemblies 24 are each rotating in the same vertical plane. In the biplane orientation, wing 14 is below cargo enclosure 30 and wing 16 is above cargo enclosure 30. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power then VTOL flight with thrust-borne lift, the operating speed of some or all of the propulsion assemblies 24 may be reduced. In certain embodiments, some of the propulsion assemblies of aircraft 10 could be shut down during forward flight. In the biplane orientation, the independent control provided by flight control system 22 over each propulsion assembly 24 provides pitch, roll and yaw authority using collective or differential thrust vectoring, differential speed control or any combination thereof.

As aircraft 10 approaches its destination, aircraft 10 may begin its transition from wing-borne lift to thrust-borne lift. As best seen from the progression of FIGS. 2E-2H, aircraft 10 is operable to pitch up from the biplane orientation to the VTOL orientation to enable, for example, a vertical landing operation. As seen in FIG. 2F, longitudinal axis 10a extends out of the horizontal plane H such that aircraft 10 has an inclined flight attitude of about thirty degrees pitch up. As seen in FIG. 2G, longitudinal axis 10a extends out of the horizontal plane H such that aircraft 10 has an inclined flight attitude of about sixty degrees pitch up. Flight control system 22 may achieve this operation through speed control of some or all of propulsion assemblies 24, thrust vectoring of some or all of propulsion assemblies 24 or any combination thereof. In FIG. 2H, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. As best seen in FIG. 2I, aircraft 10 has landing in a tailsitter orientation at the destination location. Cargo 26 may now be removed from cargo enclosure 30 through an automated or manual process.

Figure 2O:
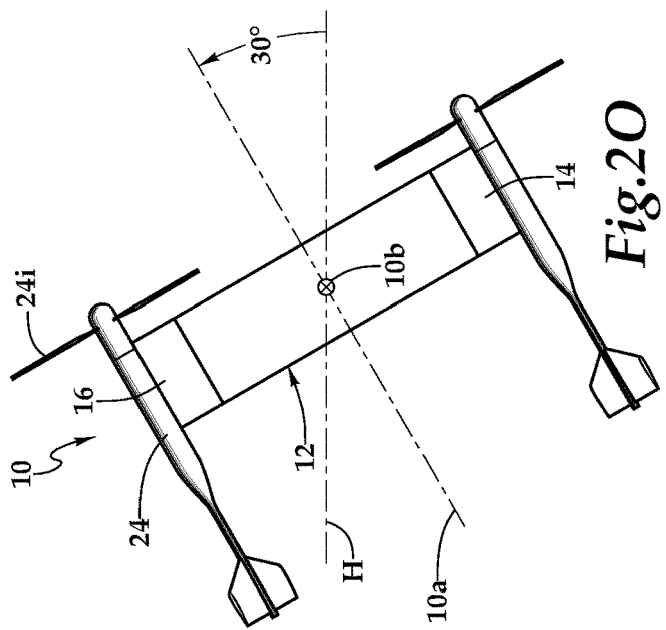
FIGS. 2A-2R are schematic illustrations of the aircraft of FIG. 1 in a sequential flight operating scenario in accordance with embodiments of the present disclosure.

Continuing with the flight scenario illustrated in FIGS. 2J-2R, cargo enclosure 30 has also been removed from airframe 12 such that aircraft 10 is now in its minimal drag flight configuration in which air is able to pass through the central region of airframe 12 between wings 14, 16 and pylons 18, 20. The minimal drag flight configuration of aircraft 10 is a low weight and high efficiency configuration that enables reduced fuel consumption when aircraft 10 is not carrying cargo 26. As best seen in FIG. 2J, aircraft 10 is in a tailsitter position on the ground with cargo enclosure 30 removed from airframe 12. When aircraft 10 is ready for the return mission, flight control system 22 commences operations providing flight commands to the various components of aircraft 10. Flight control system 22 may be operating responsive to autonomous flight control, remote flight control or a combination thereof.

As best seen in FIG. 2K, aircraft 10 has performed a vertical takeoff and is engaged in thrust-borne lift in the VTOL orientation of aircraft 10. As illustrated, rotor assemblies 24i of propulsion assemblies 24 are each rotating in the same horizontal plane. As longitudinal axis 10a and lateral axis 10b are both in horizontal plane H, aircraft 10 has a level flight attitude. During hover, flight control system 22 may utilize differential speed control and/or differential or collective thrust vectoring of propulsion assemblies 24 to provide hover stability for aircraft 10 and to provide pitch, roll, yaw and translation authority for aircraft 10.

After vertical ascent to the desired elevation, aircraft 10 may begin the transition from thrust-borne lift to wing-borne lift. As best seen from the progression of FIGS. 2K-2N, aircraft 10 is operable to pitch down from the VTOL orientation toward the biplane orientation to enable high speed and/or long range forward flight. As seen in FIG. 2L, longitudinal axis 10a extends out of the horizontal plane H such that aircraft 10 has an inclined flight attitude of about thirty degrees pitch down. As seen in FIG. 2M, longitudinal axis 10a extends out of the horizontal plane H such that aircraft 10 has an inclined flight attitude of about sixty degrees pitch down. Flight control system 22 may achieve this operation through speed control of some or all of propulsion assemblies 24, thrust vectoring of some or all of propulsion assemblies 24 or any combination thereof.

Figure 2N:
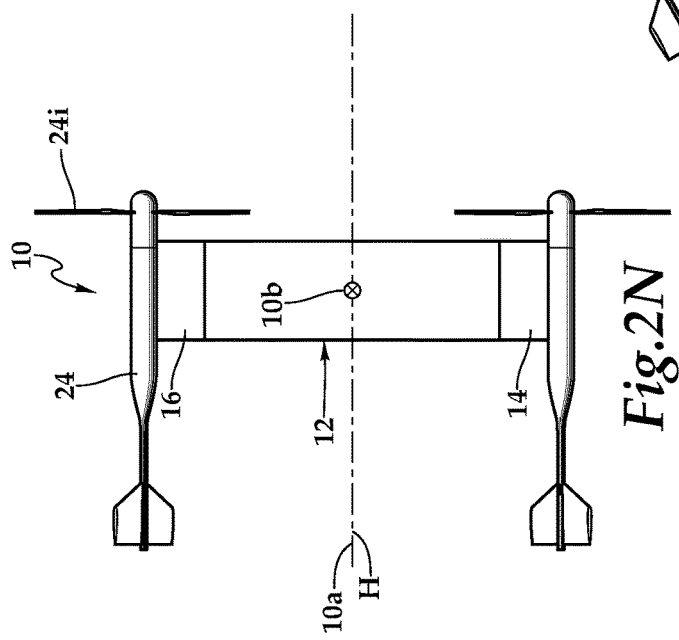
Figure 2M:
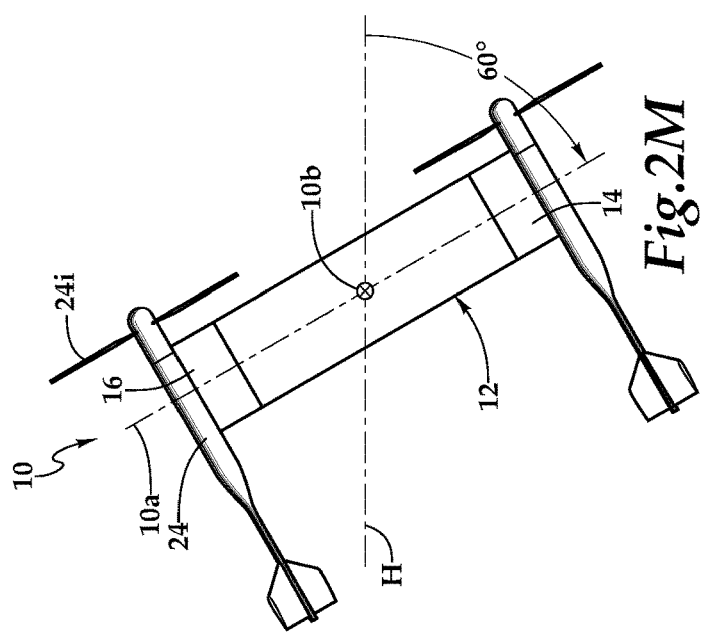

As best seen in FIG. 2N, rotor assemblies 24i of propulsion assemblies 24 are each rotating in the same vertical plane. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power then VTOL flight with thrust-borne lift, the operating speed of some or all of the propulsion assemblies 24 may be reduced. In the biplane orientation, the independent control provided by flight control system 22 over each propulsion assembly 24 provides pitch, roll and yaw authority using collective or differential thrust vectoring, differential speed control or any combination thereof. As aircraft 10 approaches its destination, aircraft 10 may begin its transition from wing-borne lift to thrust-borne lift. As best seen from the progression of FIGS. 2N-2Q, aircraft 10 is operable to pitch up from the biplane orientation to the VTOL orientation to enable, for example, a vertical landing operation. As seen in FIG. 2O, longitudinal axis 10a extends out of the horizontal plane H such that aircraft 10 has an inclined flight attitude of about thirty degrees pitch up. As seen in FIG. 2P, longitudinal axis 10a extends out of the horizontal plane H such that aircraft 10 has an inclined flight attitude of about sixty degrees pitch up. Flight control system 22 may achieve this operation through speed control of some or all of propulsion assemblies 24, thrust vectoring of some or all of propulsion assemblies 24 or any combination thereof. In FIG. 2Q, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. As best seen in FIG. 2R, aircraft 10 has landing in a tailsitter orientation at the destination location.

Figure 3:
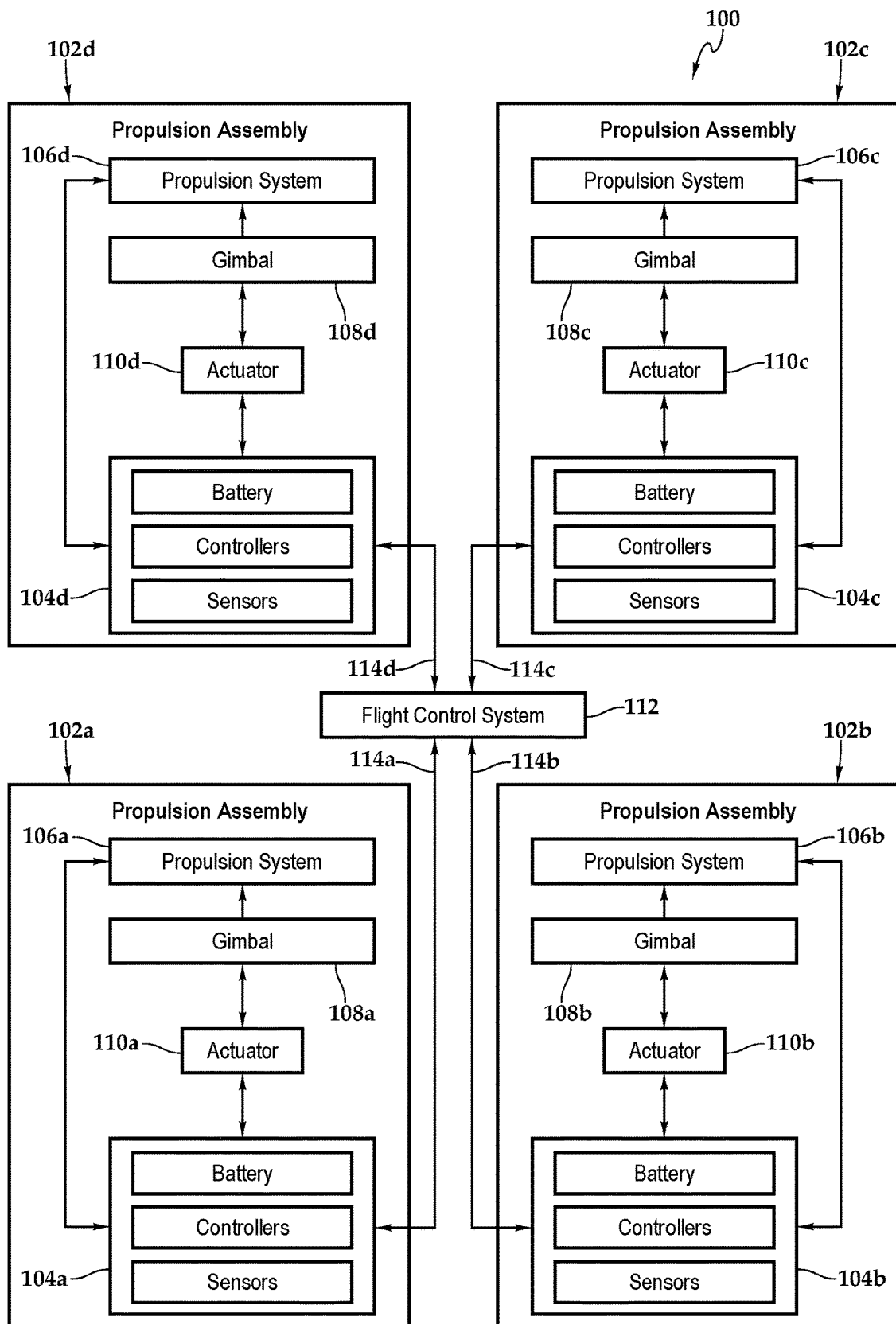
FIG. 3 is a block diagram of one implementation of a thrust array and a flight control system for an aircraft in accordance with embodiments of the present disclosure.

Referring next to FIG. 3, a block diagram illustrates one implementation of a thrust array and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes an electronics node 104a depicted as including controllers, sensors and one or more batteries. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non thrust vectoring propulsion assembly.

Propulsion assembly 102b includes an electronics node 104b depicted as including controllers, sensors and one or more batteries. Propulsion assembly 102b also includes a propulsion system 106b described herein as including an electric motor and a rotor assembly. In the illustrated embodiment, propulsion assembly 102b includes a two-axis gimbal 108b operated by one or more actuators 110b. Propulsion assembly 102c includes an electronics node 104c depicted as including controllers, sensors and one or more batteries. Propulsion assembly 102c also includes a propulsion system 106c described herein as including an electric motor and a rotor assembly. In the illustrated embodiment, propulsion assembly 102c includes a two-axis gimbal 108c operated by one or more actuators 110c. Propulsion assembly 102d includes an electronics node 104d depicted as including controllers, sensors and one or more batteries. Propulsion assembly 102d also includes a propulsion system 106d described herein as including an electric motor and a rotor assembly. In the illustrated embodiment, propulsion assembly 102d includes a two-axis gimbal 108d operated by one or more actuators 110d.

A flight control system 112 is operably associated with each of propulsion assemblies 102a, 102b, 102c, 102d and is communicably linked to the electronic nodes 104a, 104b, 104c, 104d thereof by a communications network depicted as arrows 114a, 114b, 114c, 114d between flight control system 112 and propulsion assemblies 102a, 102b, 102c, 102d. Flight control system 112 receives sensor data from and sends commands to propulsion assemblies 102a, 102b, 102c, 102d to enable flight control system 112 to independently control each of propulsion assemblies 102a, 102b, 102c, 102d as discussed herein.

Figure 4:
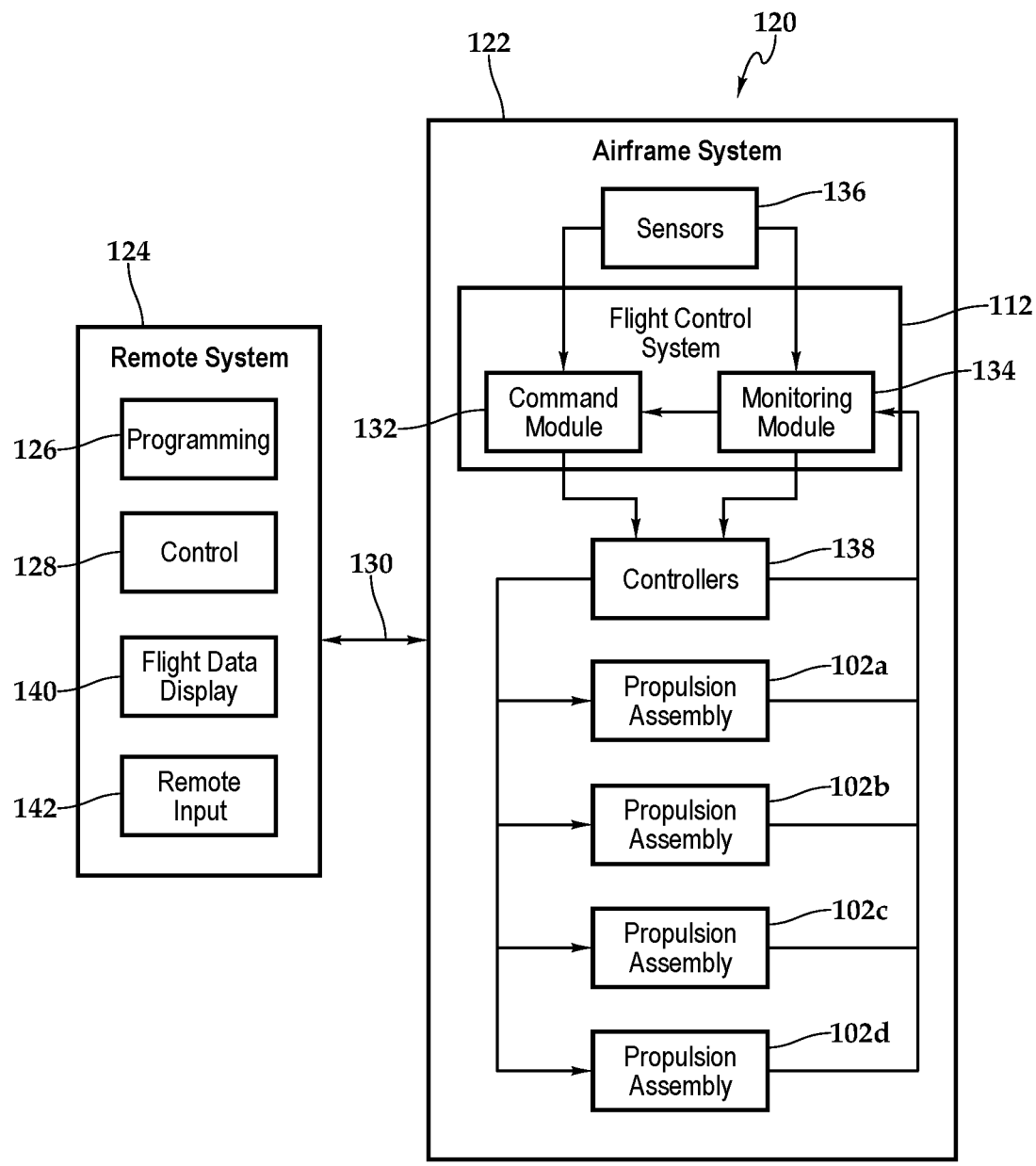
FIG. 4 is a block diagram of autonomous and remote control systems for an aircraft in accordance with embodiments of the present disclosure.

Referring additionally to FIG. 4 in the drawings, a block diagram depicts a control system 120 operable for use with aircraft 100 or aircraft 10 of the present disclosure. In the illustrated embodiment, system 120 includes two primary computer based subsystems; namely, an airframe system 122 and a remote system 124. In some implementations, remote system 124 includes a programming application 126 and a remote control application 128. Programming application 126 enables a user to provide a flight plan and mission information to aircraft 100 such that flight control system 112 may engage in autonomous control over aircraft 100. For example, programming application 126 may communicate with flight control system 112 over a wired or wireless communication channel 130 to provide a flight plan including, for example, a staring point, a trail of waypoints and an ending point such that flight control system 112 may use waypoint navigation during the mission. In addition, programming application 126 may provide one or more tasks to flight control system 112 for aircraft 100 to accomplish during the mission. Following programming, aircraft 100 may operate autonomously responsive to commands generated by flight control system 112.

Flight control system 112 preferably includes a non-transitory computer readable storage medium including a set of computer instructions executable by a processor. Flight control system 112 may be a triply redundant system implemented on one or more general-purpose computers, special purpose computers or other machines with memory and processing capability. For example, flight control system 112 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 112 may be a microprocessor-based system operable to execute program code in the form of machine-executable instructions. In addition, flight control system 112 may be selectively connectable to other computer systems via a proprietary encrypted network, a public encrypted network, the Internet or other suitable communication network that may include both wired and wireless connections.

In the illustrated embodiment, flight control system 112 includes a command module 132 and a monitoring module 134. It is to be understood by those skilled in the art that these and other modules executed by flight control system 112 may be implemented in a variety of forms including hardware, software, firmware, special purpose processors and combinations thereof. Flight control system 112 receives input from a variety of sources including internal sources such as sensors 136, controllers 138 and propulsion assemblies 102a, 102b, 102c, 102d and external sources such as remote system 124 as well as global positioning system satellites or other location positioning systems and the like. For example, as discussed herein, flight control system 112 may receive a flight plan for a mission from remote system 124. Thereafter, flight control system 112 may be operable to autonomously control all aspects of flight of an aircraft of the present disclosure.

For example, during the various operating modes of aircraft 100 including vertical takeoff and landing flight mode, hover flight mode, forward flight mode and transitions therebetween, command module 132 provides commands to controllers 138. These commands enable independent operation of each propulsion assembly 102a, 102b, 102c, 102d including rotor speed, thrust vector and the like. Flight control system 112 receives feedback from controllers 138 and each propulsion assembly 102a, 102b, 102c, 102d. This feedback is processes by monitoring module 134 that can supply correction data and other information to command module 132 and/or controllers 138. Sensors 136, such as positioning sensors, attitude sensors, speed sensors, environmental sensors, fuel sensors, temperature sensors, location sensors and the like also provide information to flight control system 112 to further enhance autonomous control capabilities.

Some or all of the autonomous control capability of flight control system 112 can be augmented or supplanted by remote flight control from, for example, remote system 124. Remote system 124 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 124 communicates with flight control system 112 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a biplane orientation, the aircraft comprising:
   an airframe having first and second wings with first and second pylons extending therebetween forming a central region;
   a two-dimensional distributed thrust array attached to the airframe, the thrust array including a plurality of propulsion assemblies coupled to the first wing and a plurality of propulsion assemblies coupled to the second wing;
   a flight control system coupled to the airframe and operable to independently control each of the propulsion assemblies;
   a nose cone selectively coupled to the airframe such that the nose cone extends between the first and second wings and between first and second pylons; and
   an afterbody selectively coupled to the airframe such that the afterbody extends between the first and second wings and between first and second pylons;
   wherein, in a cargo delivery flight configuration, the nose cone and the afterbody are coupled to the airframe to form a cargo enclosure with an aerodynamic outer shape; and wherein, in a minimal drag flight configuration, the nose cone and the afterbody are not coupled to the airframe such that air passes through the central region during flight.

2. The aircraft as recited in claim 1 wherein, in the biplane orientation, the first wing is an upper wing having a dihedral configuration and the second wing is a lower wing having an anhedral configuration.

3. The aircraft as recited in claim 1 wherein the central region forms a rectangle having a major dimension extending between the first and second wings and a minor dimension extending between first and second pylons and wherein the major dimension is greater than the minor dimension.

4. The aircraft as recited in claim 3 wherein the major dimension is between about two times and about four times greater than the minor dimension.

5. The aircraft as recited in claim 1 wherein each of the propulsion assemblies is outboard of the central region.

6. The aircraft as recited in claim 1 wherein each of the propulsion assemblies further comprises a variable speed electric motor and a rotor assembly.

7. The aircraft as recited in claim 1 wherein each of the propulsion assemblies further comprises a thrust vectoring propulsion assembly.

8. The aircraft as recited in claim 1 wherein each of the propulsion assemblies further comprises a longitudinal thrust vectoring propulsion assembly.

9. The aircraft as recited in claim 1 wherein each of the propulsion assemblies further comprises an omnidirectional thrust vectoring propulsion assembly.

10. The aircraft as recited in claim 1 wherein each of the propulsion assemblies further comprises a tail assembly with at least one aerosurface.

11. The aircraft as recited in claim 1 wherein the plurality of propulsion assemblies coupled to the first wing further comprises two propulsion assemblies and the plurality of propulsion assemblies coupled to the second wing further comprises two propulsion assemblies.

12. The aircraft as recited in claim 1 wherein the nose cone further comprises a leading edge fairing that is slidably receivable on the airframe.

13. The aircraft as recited in claim 1 wherein the afterbody further comprises a trailing edge fairing that is slidably receivable on the airframe.

14. The aircraft as recited in claim 13 wherein the trailing edge fairing further comprises first and second trailing edge members that are rotatable relative to the first and second pylons, respectively, such that the first and second trailing edge members have open and closed positions.

15. A method of operating an aircraft comprising:
providing an airframe having first and second wings with first and second pylons extending therebetween forming a central region, a plurality of propulsion assemblies coupled to the first wing, a plurality of propulsion assemblies coupled to the second wing and a flight control system operable to independently control each of the propulsion assemblies;
forming a cargo enclosure having an aerodynamic outer shape by attaching a nose cone to the airframe such that the nose cone extends between the first and second wings and between first and second pylons and by attaching an afterbody to the airframe such that the afterbody extends between the first and second wings and between first and second pylons;
disposing cargo within the cargo enclosure;
transporting the cargo by air from a first location to a second location including transitioning the aircraft between thrust-borne lift in a VTOL orientation and wing-borne lift in a biplane orientation;
removing the cargo from the cargo enclosure at the second location;
detaching the nose cone and the afterbody from the airframe forming a minimal drag flight configuration in which air passes through the central region during flight; and
returning the aircraft by air from the second location to the first location in the minimal drag flight configuration including transitioning the aircraft between thrust-borne lift in the VTOL orientation and wing-borne lift in the biplane orientation.

16. The method as recited in claim 15 wherein transporting the cargo by air from the first location to the second location further comprises transitioning the aircraft between the VTOL orientation wherein the first wing is forward of the cargo enclosure and the second wing is aft of the cargo enclosure and the biplane orientation wherein the first wing is below the cargo enclosure and the second wing is above the cargo enclosure.

17. The method as recited in claim 15 further comprising operating the aircraft responsive to autonomous flight control.

18. The method as recited in claim 15 further comprising operating the aircraft responsive to remote flight control.

19. The method as recited in claim 15 further comprising operating the aircraft responsive to a combination of remote flight control and autonomous flight control.

20. The method as recited in claim 15 wherein attaching the nose cone to the airframe further comprises slidably receiving a leading edge fairing on the airframe;
wherein attaching the afterbody to the airframe further comprises slidably receiving a trailing edge fairing on the airframe;
wherein detaching the nose cone from the airframe further comprises slidably removing the leading edge fairing from the airframe; and
wherein detaching the afterbody from the airframe further comprises slidably removing the trailing edge fairing from the airframe.

* * * * *